Figure 1:
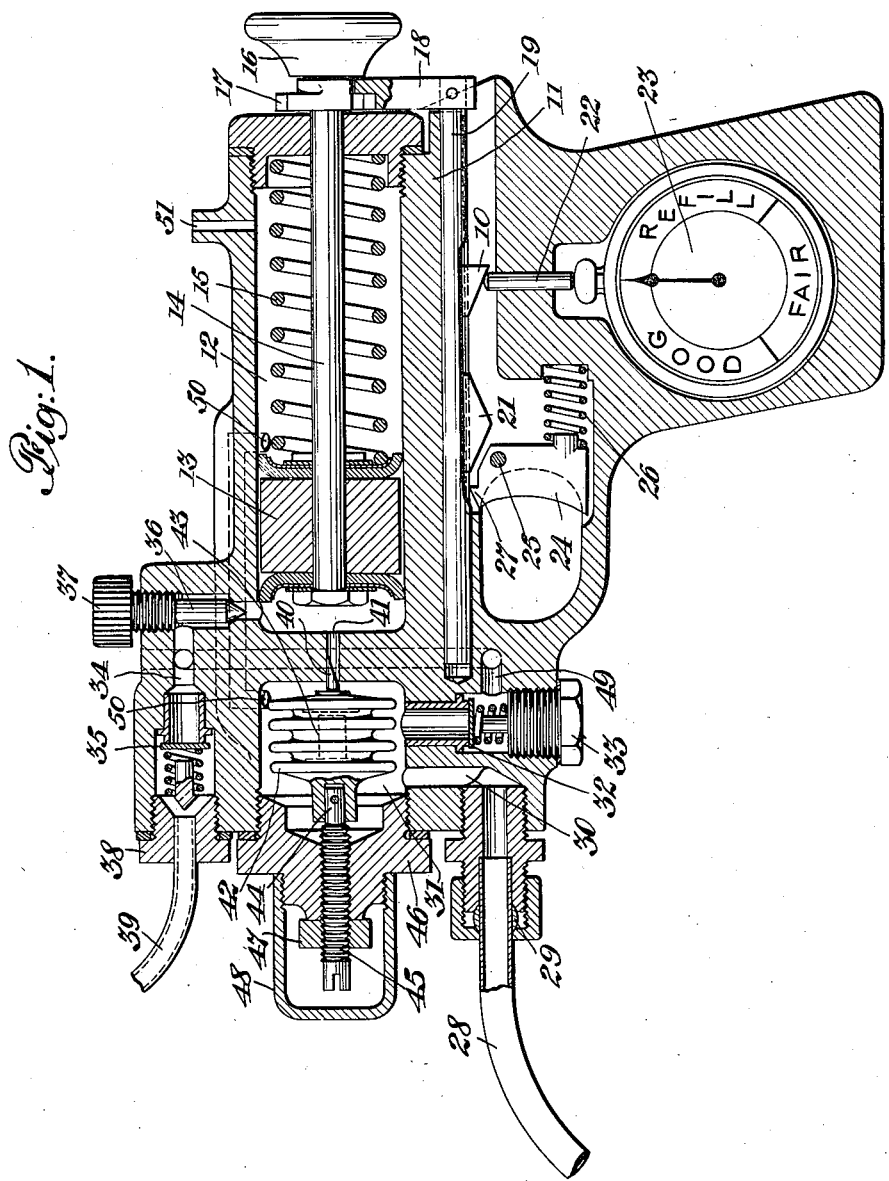

March 10, 1936.  E. A. ROCKWELL  2,033,302
VISCOSIMETER
Filed Oct. 3, 1932  2 Sheets—Sheet 1

INVENTOR
Edward A. Rockwell
BY
ATTORNEY

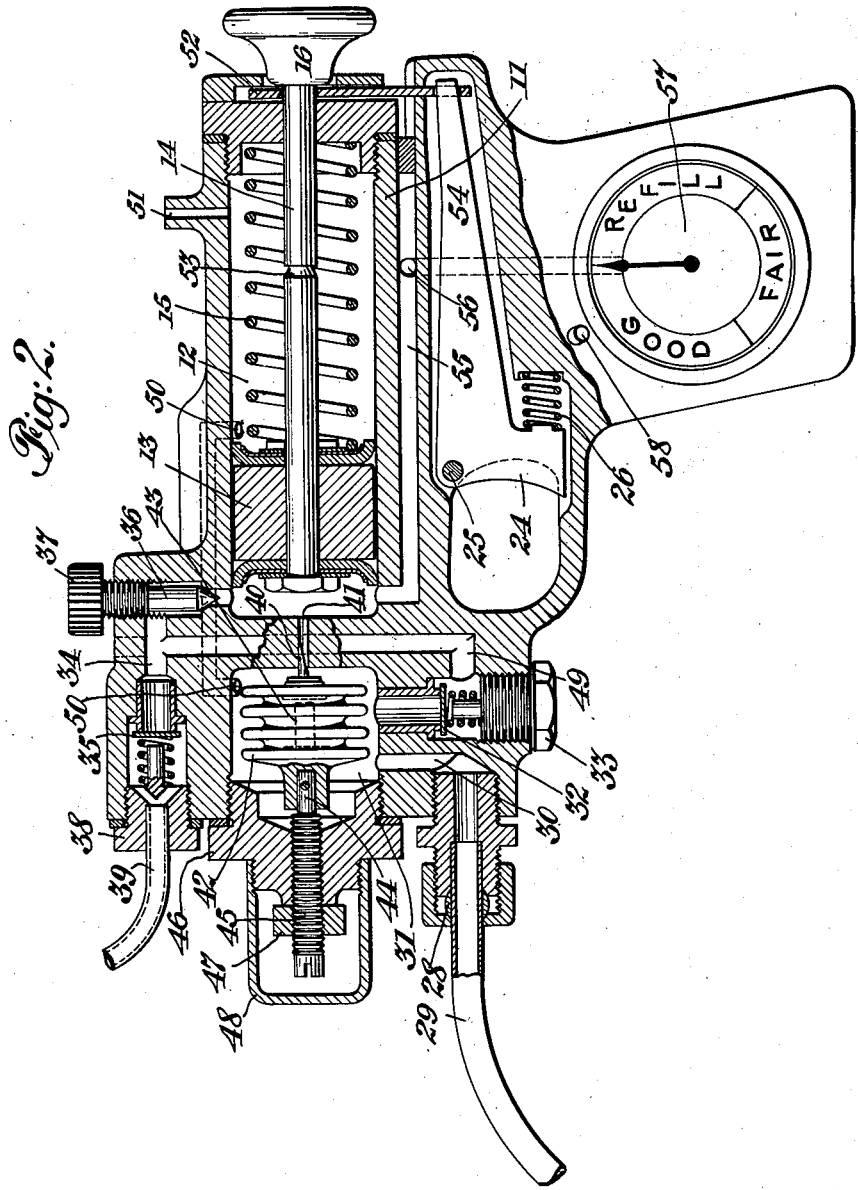

Patented Mar. 10, 1936

2,033,302

UNITED STATES PATENT OFFICE 2,033,302

VISCOSIMETER

Edward A. Rockwell, Forest Hills, N. Y., assignor to Patent Engineering Corporation, a corporation of Delaware Application October 3, 1932, Serial No. 635,993

9 Claims. (Cl. 265—11)

This invention relates to improvements in viscosimeters. The object of this invention is to provide an easily portable and compact instrument by means of which the viscosity of liquids such as oil can be quickly, easily and accurately tested. It is directed more particularly toward the testing of automobile crank case oil by filling station attendants, but it should be clearly understood that the device is applicable to the testing of any liquid. For the sake of illustration, the device will be described as applied to testing oil where a compact portable viscosimeter is necessary and where it is used by unskilled labor where other types of viscosimeters could not be readily used.

It is customary for motorists upon stopping at filling stations, to order their motor oil checked. The attendant measures the height of oil in the crank case, thus determining whether an additional amount is required to assure the proper level. This method, while it provides a check as to the quantity of oil, takes no account of its viscosity and consequent quality as a lubricant. Thus it is possible for a crank case to have a supply of oil which is ample in amount but of such low viscosity due to long use, gasoline dilution, improper selection or poor initial quality, as to be dangerously unfit for further use in the motor. By the use of this invention, an unskilled attendant can accurately and quickly test the oil for viscosity thus determining its degree of suitability at a glance, no matter what the oil temperature may be at the time the test is made.

Referring to the drawings:

Figure 1 is a vertical sectional view of a viscosimeter of the flow type embodying the invention, and Figure 2 is a modification of the viscosimeter shown in Figure 1, whereby it operates as an impact type viscosimeter.

Referring to Figure 1, the numeral 11 denotes the main casting or body of the device; 12 is a cylindrical bore therein in which piston 13 is adapted to make a sliding seal fit. The numeral 14 denotes a piston rod upon which 13 is assembled, and 15 is a spring of known strength which urges piston 14 toward the inner end of cylinder 12. The numeral 16 denotes a knob or handle fastened to rod 14 to provide a hand grip for pulling piston 13 outward against the pressure of spring 15.

The numeral 17 denotes a lug or interrupted flange mounted on rod 14 under handle 15, and rotatable with 16 and 14 around the axis of the latter.

The numeral 18 denotes a member adapted to engage lug 17 and be held between it and handle 16 when lug 17 is turned to downward position, that is, opposite to the position shown in the drawings. Member 18 is mounted on the end of a rod 19 which is adapted to slide in a suitable bore parallel to the bore of cylinder 12. Rod 19 carries cams 10 and 21, adapted to engage pin 22 which slides in a vertical hole in body 11.

The lower end of pin 22 engages the actuating button of a stopwatch 23 mounted in the handle portion of body 11.

The numeral 24 denotes a trigger pivoted at 25 and normally held forward by spring 26. The numeral 27 denotes a lug or latch on trigger 24, adapted to engage the inner end of rod 29 when the latter is drawn outward a given distance.

The numeral 28 denotes a tube suitable for insertion into a motor crank case for drawing a test sample of oil. The tube 28 is fastened to body 11 by a coupling 29 of known type, and connects through hole 30 with a chamber 31 formed in body 11. The numeral 32 denotes a spring-loaded valve held in place by cap 33 and opening outward from chamber 31. The numeral 34 denotes a bore or chamber opening to the atmosphere through a spring-loaded valve 35 constituting an overflow to the tube 39 for discharging air and oil, as hereinafter described. The numeral 36 denotes a needle valve member in the passageway between 34 and cylinder 12, threaded into body 11 and adjustable from open to closed position by scored head 37.

The numeral 38 denotes a bored plug or bushing which holds valve 35 in place and carries spout 39. The numeral 40 denotes a sliding valve in a bore 41, which latter connects cylinder 12 and chamber 31. The numeral 42 denotes a sealed metallic bellows containing a thermostatic fluid and operably connected to slide valve 40. The numeral 43 denotes an internal stop adapted to limit the contraction of bellows 42. Bellows 42 is fastened in place by a pin 44 which carries an adjusting stem 45 threaded into cap 46 and held in adjustment by lock nut 47. The numeral 48 denotes a protective cap screwed on a threaded shoulder of cap 46.

The numeral 49 denotes a passage or pass connecting chamber 34 with the outlet of valve 32. The numeral 50 denotes a by-pass from chamber 31 to cylinder 12, opening into the latter at a point behind the piston 13 when the latter is at extreme inward position.

The purpose of the by-pass 50 is to definitely fix the amount of oil that can be brought under pressure by the piston 13 during the compression stroke of the piston, that is to say, when it moves towards the left Fig. 1 during this stroke, the by-pass 50 will be uncovered to discharge air and oil through chamber 31 and valve 35 until the piston passes the far end of 50 in cylinder 12. Therefore, the piston 13 will be compressing a definite amount of oil from this point on when making its compression stroke.

The numeral 51 denotes a vent from cylinder 12 to the atmosphere.

The instrument just described may be termed a flow type viscosimeter and in operation scored head 37 is screwed outward to open needle valve 36. The attendant then inserts the end of tube 28 in the crank case oil supply and draws handle 16 outward, generating a suction beyond piston 13. Slide valve 40 is held in a certain position by bellows 42. The suction generated in cylinder 12 as stated causes an inflow from chamber 31 through needle valve 36, passage 49 and valve 32.

As piston 13 moves outward it closes by-pass 50, so that the only inlet to chamber 31 is through passage 30 and tube 28, and the suction described tends to draw oil up through tube 28. The attendant allows the piston to be moved inward by spring action, discharging air through chamber 34 and valve 35. This pumping action is repeated and continued, drawing oil into chamber 31 and from it through valve 32 and connecting passage 49 to chamber 34 and cylinder 12.

It will be observed that valve 32 opens only on the suction stroke of the piston 13 in order to admit oil from the chamber 31 through the passage 49 to chamber 34 and thence past the needle valve 36 into the cylinder 12 but when the valve 36 is closed, when making a test on the compression stroke of the piston 13, the only passage existing between cylinder 12 and chamber 31 is the bore 41 in which is located a slide valve 40 which is thermostatically controlled. Obviously any other type of controlled valve can be substituted for the more convenient thermostatically controlled valve, and this valve can vary in accordance with the temperature of the oil to be measured; the thermostatic valve being automatic, is preferred.

During this pumping operation the nose or front of the device is normally tipped downward, so that the oil in passing through chamber 31 partly fills it and comes in contact with bellows 42, causing the thermostatic fluid therein to assume a temperature and consequent pressure in accordance with the temperature of the oil, thereby adjusting the valve 40 in accordance with the temperature of the oil.

The pumping is continued until cylinder 12 is filled with oil as far as the opening of by-pass 50, and chamber 34 is completely filled. This condition is indicated by the oil being forced out through valve 35 and tube 39 constituting an overflow. Before the last outward pull of handle 16 the latter is turned so as to bring lug 17 into engagement with member 18. As the handle is drawn out, rod 19 is drawn with it until the end of 19 is engaged by trigger catch 27, which prevents it moving inward and holds the handle, rod 14 and piston assembly at outward or cocked position. The attendant then screws head 37 down, closing needle valve 36, and sets stopwatch 23 to initial position. The device is now filled and ready for test action.

The attendant now pulls trigger 24, releasing catch 27. Piston 13 moves inward under pressure of spring 15 and covers by-pass 50. Oil in front of piston 13 is now under full pressure of spring 15, and flows through slide valve 40 into chamber 31 at a rate dependent on its viscosity. The oil flows back through passage 30 and tube 28 to the crank case, oil supply or any other desired point of disposal. Due to the open passageway 30 the oil does not unseat the valve 32 during this action.

As piston 13 reaches a determined point, cam 21 on rod 19 trips and starts stopwatch 23 through pin 22. Piston 13 continues to move onward, forcing oil through valve 40 until cam 20 engages pin 22 and stops watch 23, completing the test.

The function of the thermostatic bellows 42 is to vary the resistance to opening of valve 40 in accordance with differences in temperature of oils being tested. The result is a valve orifice which is automatically adjusted to compensate for differences in viscosity which are due to temperature differences, thus reducing all test readings to a standard basis. It is clear that the action of this instrument is to force a predetermined quantity of oil under predetermined pressure through a relatively standard orifice at the equivalent of a predetermined standard temperature, so that the time recorded on a properly calibrated watch dial gives a true reading of the viscosity in Saybolt seconds.

Figure 2 shows a second embodiment of the invention and may be termed an impact viscosimeter.

Referring to Figure 2, numerals corresponding to those on Figure 1 denote corresponding parts, while the following additional numerals denote parts added or substituted numerals.

The numeral 52 denotes a sliding latch adapted to engage groove 53 in rod 14 when the latter is in drawn out or retracted position. The numeral 54 denotes a lever forming part of trigger 24, and engaging latch 52. The numeral 55 denotes a passage opening into cylinder 12 and connected through passage 56 to pressure stop gage 57. The numeral 58 denotes a reset button for returning the indicator of gage 57 to initial reset position.

The pressure stop gage has a hand adapted to be moved counter-clockwise by any suitable form of pressure responsive element, and the hand is retained at the extreme point of such movement by any suitable means until released by the reset button 58 when it is returned to its initial position by retracting means such as a spring. Such gages are well known and any suitable type may be used,—therefore the gage is not described in detail.

In this instrument, the timing device as described in connection with Figure 1 is replaced by a pressure indicating mechanism. The operation of this type is as follows: The instrument is charged with oil as already previously described, the trigger 24 being held back to prevent latch 52 from catching groove 53 during the pumping operation. When the instrument is charged the trigger is released on the last outward stroke of the piston, allowing latch 52 to drop into groove 53 in rod 14, holding the piston, rod and handle in "cocked" position, by-pass 50 being open ahead of the piston. The trigger is now pulled, releasing latch 52, and the piston is forced suddenly forward past by-pass 50, and coming to bear against the oil in cylinder 12. The resulting impact is relieved by the escape of oil through slide valve 40, the maximum pressure developed being indicated on gage 57 through passages 55 and 56. It is clear that the ease of escape through 40 will be dependent on the viscosity of the oil, and the higher the viscosity the greater the maximum pressure developed. By using a dial on gage 57 calibrated to any desired standard, the maximum pressure indicated thereon gives a true record of the viscosity with regard to that standard.

The tube 28 and the passage 30 in the body 11 form the "inlet" to the viscosimeter. This is termed "inlet" in the appended claims as it is obvious the entire "inlet" could be formed by a single tube or member 28 extending all the way into the chamber 31 without the inter-position of the coupling 29 and passage 30. Therefore it may be said that the viscosimeter has an "inlet" which inlet is so generally defined in the appended claims. The chamber 31 of the viscosimeter also has an outlet. This may, under certain conditions of operation, be the valve 32, or it may be the by-pass 50, or the valved chamber 34, or the thermostatic valve 40 in the orifice 41. This "outlet" is so generally defined in the appended claims except where the sliding valve 40 in the orifice 41 is referred to, in which case this valve is specially described and claimed, although it too, under pressure conditions, forms the "outlet" to the device.

Although the invention has been disclosed in connection with the specific details of preferred embodiments thereof, it must be understood that such details are not intended to be limitative of the invention except in so far as set forth in the accompanying claims.

What is claimed is:

1. In a viscosimeter having indicating means and a body portion forming a chamber, inlet and outlet members communicating with said chamber, a pump communicating with said outlet, a manually operable valve between said pump and outlet, a member forming a passage between said pump and said chamber, and an adjustable valve in said passage.

2. A viscosimeter comprising a body portion having two chambers formed therein, a member forming a duct connecting said chambers, a thermostatically controlled valve in said duct, inlet and outlet connections to one of said chambers, a piston in the other chamber adapted to cooperate therewith and form a pump, a member forming a passage in said last chamber to the outlet, a manually operable valve in said passage, a trigger mechanism connected to said piston, and timing means under the control of said trigger mechanism.

3. A viscosimeter comprising a body portion forming separate chambers, a member forming a duct connecting said chambers, a valve in said duct and means for adjusting said valve in relation to the temperature of fluids flowing through said duct, inlet and outlet connections to one of said chambers, a piston in the other chamber adapted to cooperate therewith to form a pump, a member forming a passage in said chamber in front of said piston communicating with said outlet, a spring for urging said piston towards said outlet, means connected to said piston for manually moving the same, and timing means under the control of said piston, whereby the length of time said piston requires to complete one full compression stroke may be determined.

4. A viscosimeter comprising a body portion, pumping means located within said body portion including a piston and cylinder forming a chamber which may be filled with liquid, temperature responsive means associated with said chamber, said chamber having an orifice forming an outlet therefrom, the size of which is determined by said temperature responsive means, and a timing mechanism connected to said pumping means whereby the time of duration of one compression stroke thereof may be determined.

5. A viscosimeter comprising a unit structure adapted to be held in the hand comprising a body portion having inlet and outlet pipes extending therefrom and having a chamber connected to said pipes, a pump having a piston, a member forming a duct in fluid connection with said pump, a valve responsive to the temperature of the liquid to be pumped located between said pump and chamber and adapted to regulate the flow of liquid therebetween, means for moving said piston in order to fill said pump with liquid, means adapted to hold said piston in its extreme outward position, means for applying a predetermined pressure to said piston to urge it to discharge said pump, trigger means for releasing said piston, and means for measuring the force of said piston on the liquid in the pump.

6. A viscosimeter comprising a unit structure adapted to be held in the hand, having a body portion provided with inlet and outlet members extending therefrom, a manually operable pump carried on said body portion adapted to draw liquid into said inlet and eject liquid from said outlet, a manually operated valve in the outlet adapted to close the same, a valve in the inlet adapted to prevent a return flow of liquid, and a thermostatically controlled valve mounted on said body portion and adapted to regulate flow from said pump.

7. A device having a body portion including a pistol grip, trigger mechanism associated with said grip, pumping mechanism mounted adjacent said trigger mechanism including a spring pressed piston adapted to be held under spring tension by said trigger mechanism and to be released thereby, a member forming a passage constituting an outlet from said device, an adjustable valve in said passage, an inlet duct for the pumping mechanism in fluid communication with said outlet, a valve in said duct adapted to prevent a return flow of liquid, and a thermostatically controlled valve mounted in said body portion including a bellows having a volatile liquid therein adapted to expand and contract depending on the temperature of said bellows, all of the foregoing constituting a unitary portable viscosimeter.

8. A viscosimeter comprising in combination a liquid pump, means for regulating the discharge from said pump, and means for measuring the rate of said discharge, said last means being mechanically interconnected with a moving element of said pump.

9. A viscosimeter comprising a unitary structure adapted to be held in the hand including a cylinder and a piston therein, said cylinder having a port whereby the point at which the piston engages the liquid to be pumped is made definitely effective by permitting liquid to escape from said cylinder until said port is covered by said piston.

EDWARD A. ROCKWELL.